United States Patent [19]

Casset

[11] Patent Number: 4,610,440
[45] Date of Patent: Sep. 9, 1986

[54] SELF-CONTAINED WORKPIECE-HOLDING DEVICE, PREFERABLY EQUIPPED WITH AN OPERATING SYSTEM, AND ALSO ADVANTAGEOUSLY PROVIDED WITH INDIVIDUAL POWER-CYLINDER OPERATING MEANS FOR OPERATING IT AT AN INDEPENDENT PRESSURE

[75] Inventor: Dominique Casset, Saint Valerien, France

[73] Assignee: Mors, France

[21] Appl. No.: 673,343

[22] Filed: Nov. 20, 1984

[30] Foreign Application Priority Data

Nov. 25, 1983 [FR] France .................... 83 18865
Jan. 10, 1984 [FR] France .................... 84 00296
Oct. 12, 1984 [FR] France .................... 84 15696

[51] Int. Cl.$^4$ ............................................. B23Q 7/00
[52] U.S. Cl. ..................................................... 269/20
[58] Field of Search ................ 269/20, 25, 900; 51/165.72; 350/375; 60/428, 429, 430, 459, 463; 254/88

[56] References Cited

U.S. PATENT DOCUMENTS

| | | | |
|---|---|---|---|
| 3,863,890 | 2/1975 | Ruffing | 254/88 |
| 3,945,610 | 3/1976 | Solie et al. | 254/93 R |
| 4,143,868 | 3/1979 | Bergman | 269/20 |
| 4,174,828 | 11/1979 | Bergman | 269/20 |
| 4,179,106 | 12/1979 | Bergman | 269/20 |
| 4,247,306 | 1/1981 | Berge | 51/165.72 |
| 4,489,523 | 12/1984 | Webster | 51/165.72 |

*Primary Examiner*—Robert C. Watson
*Attorney, Agent, or Firm*—Steinberg & Raskin

[57] ABSTRACT

The invention relates to a workpiece-holding device provided with fastening means for fastening, by tightening, clamping or the like, the workpiece through the medium of compressed-fluid power-cylinders incorporated in the device, fed from the fluid pressure generator actuated by a source of power comprising said pressure generator incorporated in the device, the source of power being also advantageously incorporated in the device which is thereby self-contained and of reduced overall dimensions. Moreover, at least one valve assembly for the delivery of compressed fluid from the pressure generator at a predetermined pressure may be associated individually with one of the power-cylinders so that each power-cylinder operates either at a pressure independent of the operating pressure of the other power-cylinders or at different times. The invention is useful particularly for machines.

23 Claims, 6 Drawing Figures

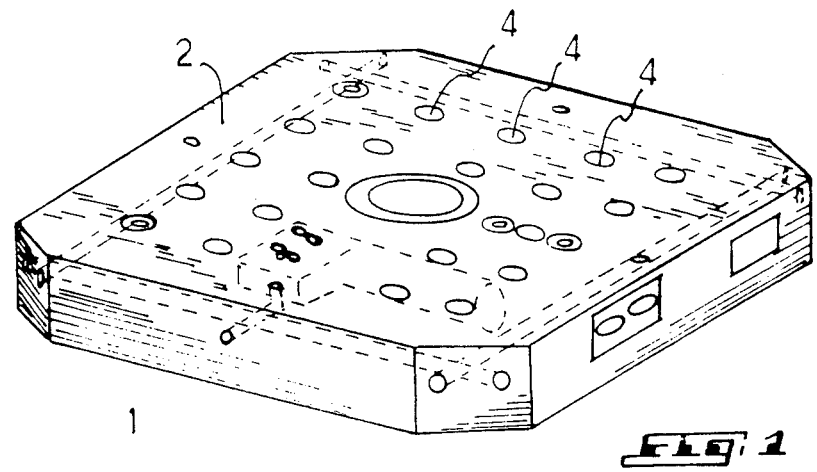
Fig. 1
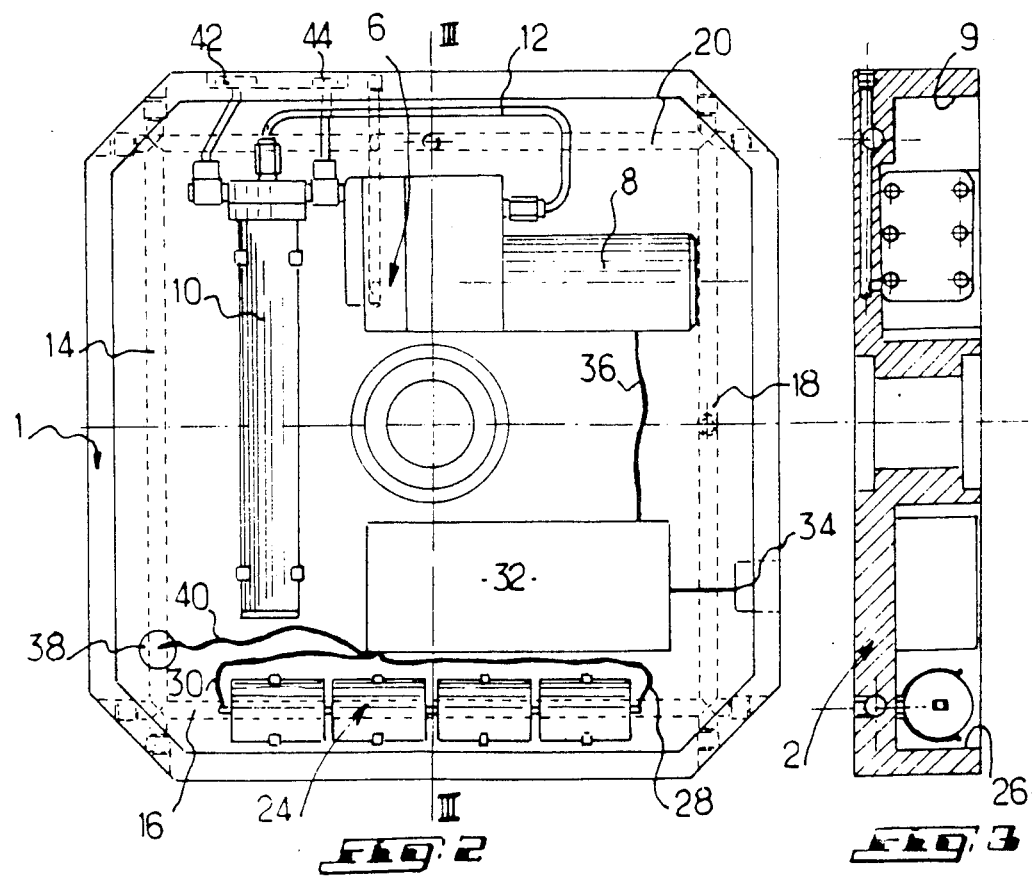
Fig. 2
Fig. 3

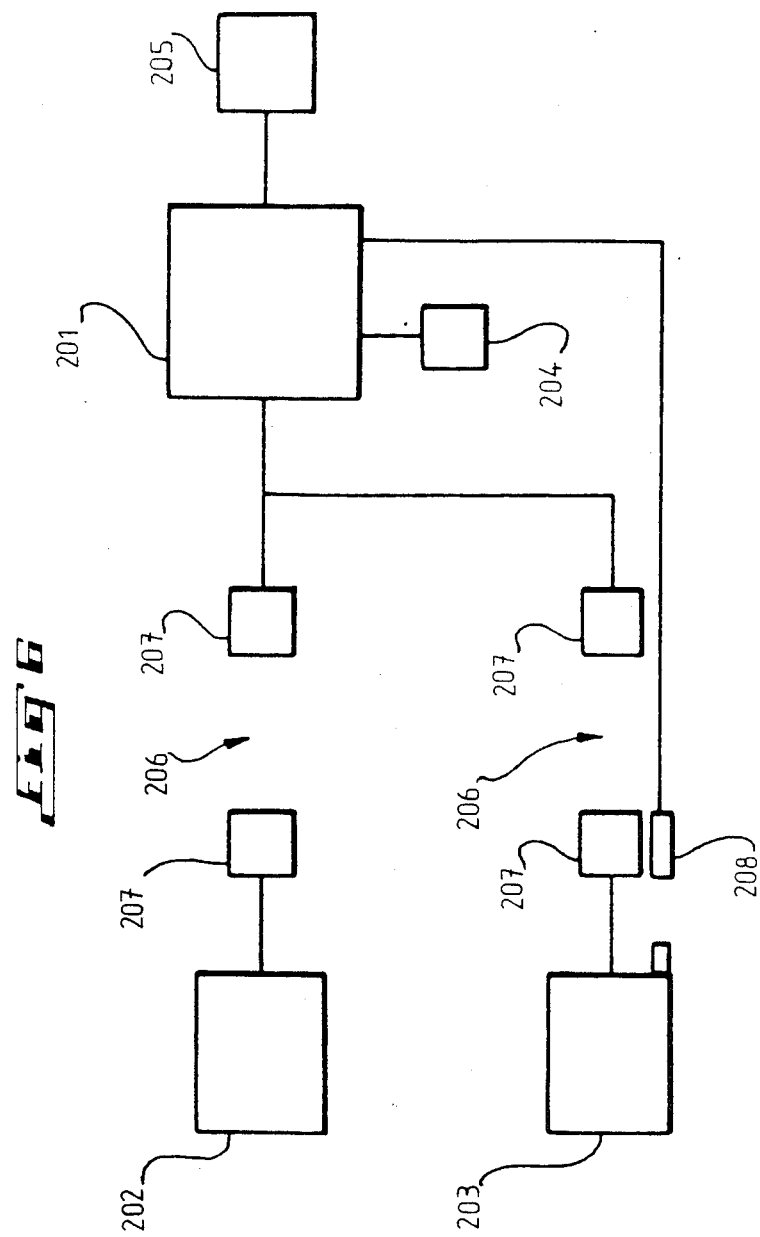

SELF-CONTAINED WORKPIECE-HOLDING DEVICE, PREFERABLY EQUIPPED WITH AN OPERATING SYSTEM, AND ALSO ADVANTAGEOUSLY PROVIDED WITH INDIVIDUAL POWER-CYLINDER OPERATING MEANS FOR OPERATING IT AT AN INDEPENDENT PRESSURE

BACKGROUND OF THE INVENTION

The present invention relates essentially to a self-contained workpiece-holding device, such as a plate, preferably including an operating system and advantageously provided with individual power-cylinder operating means for operating it at an independent pressure.

The presently known workpiece-holding plates are provided with means of fastening by tightening, clamping or the like of the said workpiece through the medium of compressed-fluid power-cylinders incorporated in the said plate and fed from a fluid-pressure generator actuated by a source of power.

In all the presently known workpiece-holding plates, the fluid-pressure generator as well as the source of power are arranged separately from the workpiece-holding plate and even, in some cases, outside the machining set. The fluid-pressure generator feeds the fastening means through flexible pipes connecting the pressure generator to the fastening means.

However, these known solutions suffer from the major drawback of an encumbering of the space by the passage of the flexible pipes which may be inadvertently deteriorated or cut.

Furthermore, the separate arrangement of the fluid-pressure generator and of the source of power increases the space occupied by the machining set.

In another respect, use is made in the known operating systems for the workpiece-holding devices of paths for the transmission of orders or commands from an external control device, which are constituted by physical links such as electric wires or cables. It is easily understood that the presence of such wires or cables is inconvenient, especially when the number of the workpiece-holding devices is relatively important.

Lastly, in these known workpiece-holding devices, all the power-cylinders are fed simultaneously at the same pressure, which has the major disadvantage of also leading to a simultaneous freeing of the pressure in all the power-cylinders. Furthermore, such operation at a single pressure requires the use, as power means, of single-acting cylinders.

SUMMARY OF THE INVENTION

The present inventor therefore applied himself to the task of resolving the new technical problem consisting in designing a workpiece-holding device avoiding the presence of flexible pipes for feeding the fastening means outside the space occupied by the device itself and avoiding the prior encumbrance by the fluid-pressure generator and by the source of power.

Furthermore, the present inventor also applied himself to the task of resolving the new technical problem of providing a system for operating the workpiece-holding device without physical links such as electric wires or cables.

Lastly, the present inventor also applied himself to the task of resolving the new technical problem consisting in designing a workpiece-holding device wherein each power means, generally constituted by a power-cylinder, can be fed individually at a predetermined pressure so as to operate at a pressure independent of the operating pressure of the other cylinders and/or at different times.

Lastly, the present inventor also applied himself to the task of resolving the new additional technical problem consisting in allowing the operation of each of the power means, usually constituted by a power-cylinder, at at least two different pressures.

According to a first one of its aspects, the solution to the above-mentioned technical problems in provided for the first time by the present invention by the provision of a workpiece-holding device provided with means for fastening by tightening, clamping or the like of the said workpiece through the medium of compressed-air power-cylinders incorporated in the said device, and fed from a fluid-pressure generator actuated by a source of power, characterized in that the pressure generator is incorporated in the said device.

According to a preferred form of embodiment, the source of power is also incorporated in the device which, thus, is self-contained.

According to a particular form of embodiment, the fluid-pressure generator is an electro-hydraulic generator constituted by a motor-pump unit, whereas the source of power is constituted by rechargeable electric storage batteries.

Furthermore, according to another one of its aspects, the present invention also relates to a workpiece-holding device including means of fastening by tightening, clamping or the like of the said workpiece through the medium of power means consisting usually in one or several compressed-fluid power-cylinders incorporated in the said device, fed from a fluid-pressure generator actuated by a source of power, characterized in that it includes at least one valve assembly for the supply of the said compressed fluid at a predetermined pressure, individually associated with one of the said power-cylinders so that each power-cylinder operates at a pressure independent of the operating pressure of the other power-cylinders and/or at different times.

According to a particularly preferred form of embodiment of the device according to the invention, the latter is furthermore characterized in that it includes at least two aforesaid valve assemblies per power-cylinder so that each power-cylinder can operate at at least two different pressures.

According to a presently preferred form of embodiment of the device, each aforesaid assembly includes three non-return valves, two of which are preferably electromagnet-controlled.

According to a particularly advantageous feature, each electromagnet of each said controlled valve is actuated automatically, preferably by being controlled from a central system which advantageously is provided with a device for linking by an infrared device.

Thus, according to another one of its aspects, the present invention relates to a system of control of one or several aforesaid workpiece-holding devices, characterized in that it includes a central control station intended to control the workpiece-holding devices by means of an infrared-ray linking device.

According to still another advantageous feature of the invention, the central station is equipped with an information processing unit, preferably a microprocessor, preferably adapted to be connected either to a manual operating device or to a digital control center such as a programmable automatic unit or a digital control machine.

According to another feature of the invention, each power-cylinder may be a single-acting cylinder so that each cylinder operates only at a single pressure, which, however, is independent of the operating pressure of the other cylinders.

According to a variant of embodiment, each power-cylinder is a double-acting cylinder, each acting direction of which is controlled by an aforesaid supply assembly so that each cylinder operates at at least two different pressures.

BRIEF DESCRIPTION OF THE DRAWINGS

Other purposes, features and advantages will appear clearly in light of the explanatory description given with reference to the appended drawings illustrating several presently preferred forms of embodiment of the device of the invention, given solely by way of example and which, therefore, should in no way limit the scope of the invention. In the drawings:

FIG. 1 is a perspective view of a self-contained workpiece-holding plate device according to the present invention;

FIG. 2 is a view from below of the plate shown in FIG. 1;

FIG. 3 is a section view upon the line III—III of FIG. 2;

FIG. 6 shows an operating system according to the present invention, for one or several workpiece-holding devices such as those illustrated in FIGS. 1 through 5.

DETAILED DESCRIPTION OF THE PREFERRED EMBODIMENTS

Figure 4:
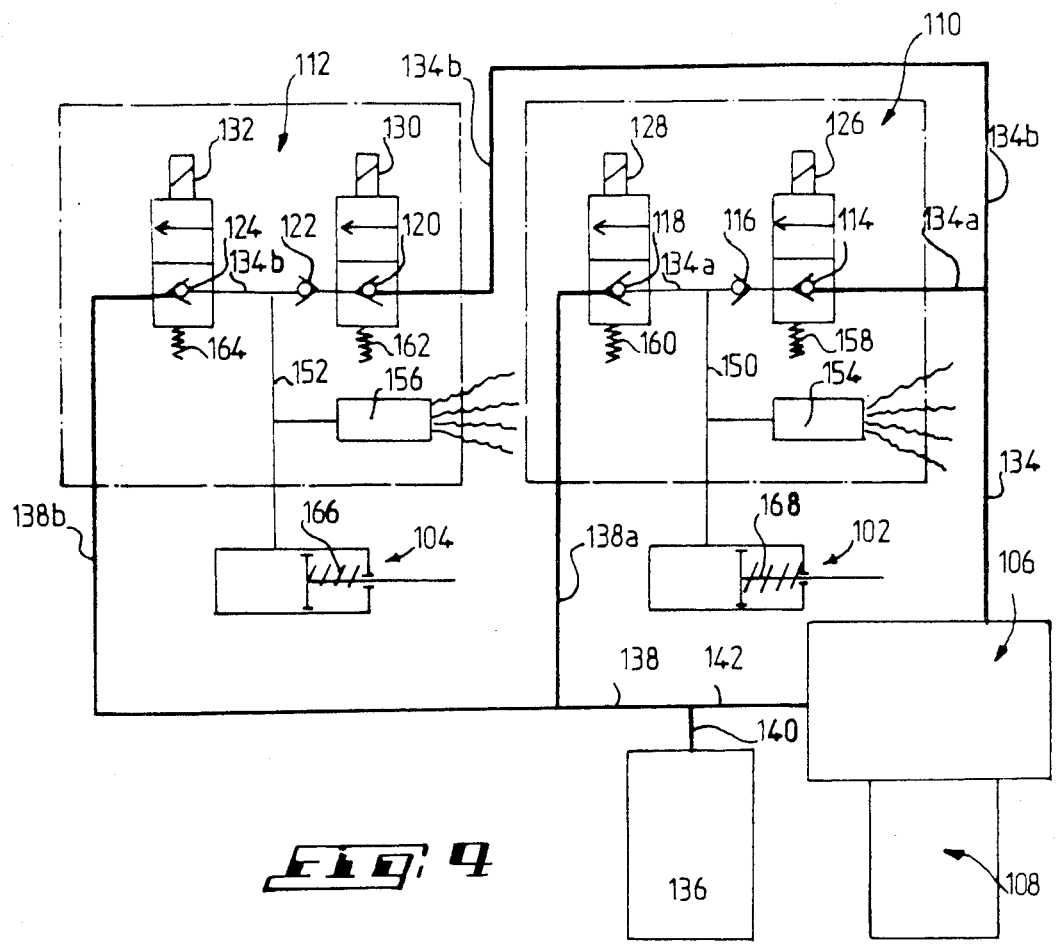
FIG. 4 is a diagrammatic view of the valve-assemblies for the supply of the compressed fluid at a predetermined pressure according to the invention, which are intended to be provided on workpiece-holding device shown in FIG. 1 through 3.

Referring to FIGS. 1 through 3, the workpiece-holding plate denoted by the general reference numeral 1 is provided on its upper face 2 with a plurality of orifices 4 allowing fastening means to be attached therein by tightening, clamping or the like of the workpiece.

Together with these fastening means, or in other orifices provided in the upper face 2 of the plate 1, are provided compressed-fluid power-cylinders (not shown for the sake of clarity of the drawing but shown in FIG. 4 and denoted by the general reference numerals 102,104).

These power-cylinders are fed from a fluid-pressure generator actuated by a source of power.

According to the present invention, the workpiece-holding plate is characterized in that the pressure generator, clearly seen in FIG. 2 and denoted by the general reference numeral 6, is incorporated in the plate 1, in one or several recesses or hollows such as 9 which are clearly seen in FIG. 3.

The said pressure generator includes for example, according to the form of embodiment illustrated, an electrohydraulic set 8 constituted by a motor-pump unit. The fluid, a hydraulic fluid in the case considered, is supplied from a tank 10 which also is incorporated in the plate 1, in a corresponding hollow thereof.

According to the form of embodiment illustrated, it can be seen that flexible fluid-feed pipes are incorporated in the plate 2, such as flexible pipes 12 and/or are constituted by an integrated circuit constituted by passage-ways such as 14,16,18,20, communicating with one another and provided within the body of the plate 1, as is clearly undestandable from FIGS. 1 to 3.

According to a preferred form of embodiment illustrated, the source of power 24 also is incorporated in the plate 2 in a recess or hollow 26 (FIG. 3) of the plate 2. Of course, the source of power 24 is connected by connecting elements 28,30, for example to an electronic control unit 32, preferably controlled from a microcomputer, microprocessor or the like through a connection at 34, thus allowing the pressure generator 6 to be operated through another connection 36. A preferred form of embodiment of this connection will be described later in connection with FIG. 6.

In the example illustrated, the source of power is constituted by rechargeable electric storage batteries, which are also replaceable at will.

Also shown in FIG. 2 is a pressure-sensitive element 38 connected by connecting means 40 to the electronic unit 32, as well as an inlet 42 and an outlet 44 for the hydraulic fluid, connectable at will to an outside source of fluid.

It is thus understood that there is obtained, according to the present invention, an entirely self-contained workpiece-holding plate of reduced overall dimensions with substantially no flexible pipe passing outside the plate and capable of being damaged or cut inadvertently.

Furthermore, it is easily understood that the source of power 24 may be placed outside the plate, although this would increase the space occupied thereby, or that it may momentarily be replaced or backed by an external source of power, although this is not the presently preferred solution.

Thus, the invention applies to any workpiece-holding device, which device may be constituted by a plate, a square, a cube or even a machine-tool table, etc.

Furthermore, and with reference to FIG. 4, another form of embodiment of a workpiece-holding device of the invention includes means for fastening by tightening, clamping or the like (not shown) of the said workpiece through the medium of power means consisting usually of one or several compressed-fluid power-cylinders 102,104 incorporated in the device and fed from a fluid-pressure generator 106, actutated by a source of power 108.

This device is characterized, according to the invention, in that it includes at least one assembly 110, 112, with valves 114, 116, 118; 120, 122, 124 for the supply of the said compressed fluid at a predetermined pressure, individually associated with one of the said cylinders 102, 104, respectively, so that each power-cylinder 102, 104 operates at a pressure independent of the operating pressure of the other power-cylinders and/or at different times.

According to a particular feature of the device of the invention, each assembly 110,112 includes three non-return valves 114, 116, 118; 120, 122, 124, respectively, two of which are controlled preferably by electromagnets 126, 128; 130, 132. Thus, the controlled non-return valves constitute, in a way, electromagnetic valves.

As is clearly seen in FIG. 4, this device also includes a compressed fluid circuit including a duct 134 for the supply of compressed fluid connecting the outlet of the power generator 106 supplied with fluid from a fluid reservoir 136, to one or several power-cylinders 102, 104 and a duct 138 for the return of the compressed fluid, connecting the outlet of the said cylinder or cylinders 102, 104 to the said fluid reservoir 136. In practice, the return duct 138 merges with the duct 140 for the supply of fluid from the reserve 136 to the power generator 106 through a common supply duct 142.

According to the present invention, each supply duct 134 and return duct 138 is subdivided into fluid feed passage-ways (134a, 134b) and return passage-ways (138a, 138b), respectively, to and from each aforesaid assembly 110, 112 as is readily understood from FIG. 4.

Furthermore, as can be observed from FIG. 4, each feed passage-way 134a, 134b of each assembly 110, 112 leads to a first non-return valve 114, 120, respectively, controlled preferably by an electromagnet 126, 130, respectively. After this first controlled valve 114, 120 is arranged a conventional non-return valve 116, 122, respectively, arranged in opposition to the first controlled valve 114, 120.

After this simple non-return valve 116, 122, the feed passage-way 134a, 134b of each assembly 110, 112 is by-passed by a duct 150, 152 for the supply and the return of the compressed fluid to and from the power-cylinders 102, 104.

Furthermore, downstream of this by-pass passage-way 150, 152 is arranged the third non-return valve 118, 124 of each assembly 110, 112 which is the second valve controlled preferably by an electromagnet 128, 132, respectively.

It will be observed, on the other hand, that, according to the form of embodiment of FIG. 4, each power-cylinder 102, 104 is a single-acting cylinder. Furthermore, on each by-pass duct 150, 152, is provided a pressure-sensitive device 154, 156 in the by-pass duct 150, 152, respectively, which transmits information in relation to the pressure in the duct 150, 152, which is preferably transmitted and taken into account by an information processing unit.

Thus, and as mentioned previously, each electromagnet 126, 128, 130 and 132 is advantageously energized automatically, preferably by being controlled from a central control station. The latter may advantageously be provided with a device for linking by means of an infrared device which may be constituted by the one which will be described with reference to FIG. 6.

Thus, also preferably, the central station may be equipped with an information processing unit, preferably a microprocessor, also preferably adapted to be connected to either a manual operating device or a digital control center such as a programmable automatic control unit or a machine with digital control, as the one which will be described with reference to FIG. 6.

According to another preferred feature, each assembly 110, 112 is preferably incorporated in the workpiece-holding device which preferably is self-contained, such as the one described with reference to FIGS. 1 to 3.

Of course, each non-return valve is provided with usual resilient return-means such as springs 158, 160, 162, 164.

The operation of this device is as follows.

(A) Programming of the pressure-sensitive device 156 at a pressure X1, and therefore of the by-pass duct 152 at the same pressure X1, without acting upon the by-pass duct 150 for the supply of the power-cylinder 102.

Simultaneously, a hydraulic station 106 is started and the electromagnet 130 of the controlled valve 120 is energized. The fluid under pressure passes through the simple valve 122, cannot pass through the non-return valve 124, which is closed, and, therefore, is conveyed through the by-pass duct 152 to feed the power-cylinder 104, which is thus actuated. Once the pressure X1 is reached, this information is transmitted by the pressure-sensitive device and taken into account by the information processing unit which simultaneously causes the switching-off of the electromagnet 130 and, therefore, the closing of the controlled valve 120, and of the hydraulic central station 106. Of course, the controlled valve 114 of the other assembly 110 having been maintained closed, no action takes place on the power-cylinder 102 associated with the other assembly 110.

The pressure-sensitive device 156 permanently informs of the state of the pressure in the by-pass duct 152. If the pressure drops by too important a value, there take place simultaneously a restarting of the hydraulic central station 106 and an opening of the controlled valve 120 by the electromagnet 130, so as to restore the initial pressure X1.

(B) Programming of the other power-cylinder at a pressure X2, i.e., of the pressure-sensitive device 154 at this pressure X2 without acting upon the other cylinder 104.

It is sufficient to simultaneously put into operation the hydraulic central station 106 and open the controlled valve 114. At the pressure X2, the pressure-sensitive device 154 causes the simultaneous switching-off of the central station 106 and of the electromagnet 126 thus closing the controlled valve 114 under the action of the return spring 158.

(C) Removal of pressure in ducts 152 and 150

(a) Pressure drop in the duct 152, the duct 150 remaining under pressure.

It is sufficient to energize the electromagnet 132, thus causing the controlled non-return valve 124 to open. The action of the conventional spring 166 of the single-acting cylinder 104 results in the return of the fluid through the return passage-way 138b and the return passage-way 138 to the reservoir 136, since the hydraulic station 106 is not in operation.

(b) Pressure drop in the duct 150 for the supply of the cylinder 102, the other cylinder 104 being at zero pressure.

The electromagnet 128 is energized, thus causing the opening of the non-return valve 118. Likewise, the action of the conventional spring 168 of the single-acting cylinder 102 causes the return of the fluid through the return passage-way 138a and the return passage-way 138, to the reservoir 136.

It is thus readily understood that the device of the invention allows operating each cylinder 102, 104 at a pressure independent of the operating pressure of the other cylinders and/or at different times, which could not be obtained by means of the prior devices.

Figure 5:
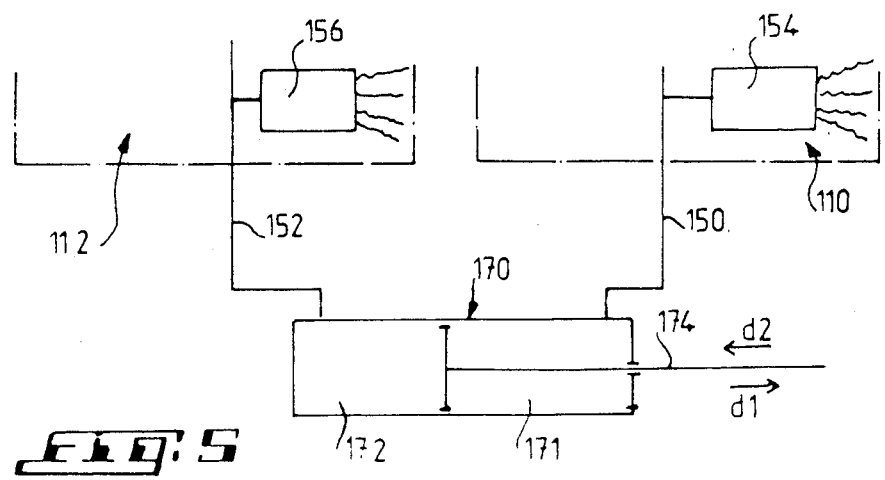
FIG. 5 illustrates a second form of embodiment of the assembly shown in FIG. 4 of the workpiece-holding device showing the essential portion which is different with respect to the form of embodiment of FIG. 4.

Referring to FIG. 5, there is shown a second form of embodiment of the device of the invention which differs from that of FIG. 4 by the fact that it includes a double-acting cylinder 170 with two cavities 171, 172, respectively.

Thus, in this form of embodiment, each cavity 171, 172 is fed from an afore-mentioned pressure delivery assembly 110, 112. Therefore, as can be seen, the aforesaid by-pass duct 150 of the assembly 110 leads to a cavity 171 whereas the by-pass duct 152 of the other assembly 112 leads to the other cavity 172.

The operation of this second form of embodiment is as follows:

(a) If it is desired to displace the power-cylinder rod 174 in the direction $d_1$ at a pressure X1, the central hydraulic station 106 is started and, simultaneously, the coils of the electromagnet 130 and of the electromagnet 128 are energized. Thus, the controlled valve 120 is opened and the fluid passes through the conventional valve 122 and enters under pressure the cavity 172 of the cylinder 170. The fluid enclosed in the other cavity 171 is expelled through the duct 150 towards the controlled valve 118 which is opened by energizing the electromagnet 128 so that this fluid returns directly through the passage-way 138a to the fluid reservoir 136.

When the pressure-sensitive device 156 has read the selected pressure X1 in the cylinder cavity 172, there takes place simultaneously a switching-off of the hydraulic station 106 and of the current in the coils of the electromagnets 130 and 128 and a closing of the controlled valve 120 and 118.

(b) Displacement of the rod 174 of the power-cylinder 170 in the direction $d_2$ at a pressure X2. The coil of the electromagnet is first energized, thus causing the opening of the valve 124 and resulting in an escape of the fluid in the cylinder cavity 172.

In addition, hydraulic station 106 is started and, simultaneously, the coil 126 is energized, thus causing the valve 114 to open. The fluid passes through the valve 116 and returns under pressure into the other cylinder cavity 171. The fluid in the cavity 172 thus flows through the valve 124 which is open and returns to the reservoir 136.

When the pressure X2 is reached in the other cylinder cavity 171 (this being detected by the pressure-sensitive device 154) the central control station switches off simultaneously the hydraulic station 106 and the coils 126 and 132, thus causing the closure of the valves 114 and 124 under the action of the return springs 158 and 164.

It is thus understood that each power-cylinder operates at two different pressures.

It is also readily understood that by increasing the number of assemblies for each power-cylinder action, on a same principle, there is obtained an operation of each action and a number of different pressures which is equal to the number of assemblies provided for each action.

The present invention therefore allows obtaining an operation of each power-cylinder at as many different pressures as desired and/or at moments which may be different without any limitation in time.

This therefore constitutes an all together unexpected technical advance over the state of the prior art.

Preferably, the workpiece-holding device is self-contained, and this is very advantageous. There is unexpectedly obtained an important miniaturization. Referring to FIG. 6, there is shown a control system according to a preferred form of embodiment of the present invention, which includes a central station 201 constituted by a stationary station and a certain number of mobile stations, of which only two stations 202 and 203 are shown. Each station includes the electronic arrangement for the control of the compressed-fluid power-cylinders for actuating the means for fastening the workpieces by tightening, clamping or the like which have been described previously.

The central station 201 is adapted to control the movable stations 202, 203. To this end, the central station includes a central information-processing unit, advantageously a microprocessor, and an external manual operating device 204 which allows determining the mobile station to which the commands must be transmitted, the working operations to be accomplished in the corresponding workpiece-holding device, such as for example the tightening or untightening force to be developed by the power-cylinders of the device. The control device 204 may be designed in any appropriate manner. It may advantageously include coder wheels and a coder-wheel reading validation key. There may also be provided an interface BCD (binary coded decimal). These measures allow the entry of the number of the mobile stations to be controlled and the entry of the tightening and untightening pressures.

According to the present invention, the central station 201 is advantageously adapted to be connected to an external digital control centre 205, such as a programmable automatic machine or a digital control machine.

The central station also includes alarm means constituted for example by light-emitting diodes (not shown) which are arranged to display any abnormalities in the operation of the workpiece-holding device, controlled from the central station. Of course, the latter may be equipped with other appropriate means ensuring perfect and reliable operation of the control system and of the workpiece-holding device.

As regards the mobile stations 202, 203, it should be noted that such a station also advantageously includes a central processing unit such as a microprocessor (not shown), intended to dialogue with the central station to ensure correct control of the power-cylinders of the workpiece-holding device and to inform the central station of any abnormalities in the operation of this device. Of course, there may be provided in the mobile stations all appropriate means for guaranteeing correct and reliable operation of the corresponding workpiece-holding device.

According to the present invention, the dialogues between the central station 201 and each mobile station 202, 203 are carried out by means of an infrared-ray bidirectional linking device 206. To this end, the central station and the mobile stations each include an infrared-ray emitter-receiver set 207. The stations can therefore dialogue without there being any physical link between them. For this same purpose, i.e. to avoid permanent physical links, the mobile station 203 is for example connectable to the central station 201, more precisely to a recharging terminal 208 of the electric storage batteries provided in the workpiece-holding device and described previously.

It is therefore understood from the foregoing description that the present invention allows resolving for the first time all the previously mentioned technical problems as well as all other technical problems which will be apparent to any person skilled in the art, in particular from the foregoing description. In particular, the following technical advantages are offered by the present invention.

The self-contained workpiece-holding device with programmable tightening means is a compact self-contained unit, i.e., a unit without external physical connections, which, owing to the adjunction of a hydraulic equipment, allows clamping workpieces for the purpose of machining without removal of metal.

It is intended to be mounted on or inserted in a machine-tool table having to be displaced over long distances, of the machining centre plate, vertical mill plate or flexible workshop plate type.

The basic principle of the device of the invention is to convert a source of electrical power accumulated in storage batteries or the like into programmable hydraulic power.

Such programming may be effected manually by means of the selection keys of an electronic unit (stationary station) outside the self-contained workpiece-holding unit physically unconnected with the latter. The dialogues are preferably performed by infrared-beam transmission. The programming may be effected automatically through the medium of a programmable automatic unit, a computer, a central machine-tool digital-control station or an automatic workpiece charging robot, which will be directly connected to the electronic unit (stationary station).

The invention offers the particularly unexpected advantage of allowing a pressure to be increased or reduced at a distance without passing through the O point (programmed untightening or over-tightening).

The invention allows permanent monitoring of the pressure in the hydraulic circuits to immediately effect a compensation should the latter diminish. Should this pressure drop become too important, owing to the double-direction emitter-receiver infrared linking, the external unit (stationary station) would immediately start an alarm signal or stop the machine.

The self-contained programmable-tightening workpiece-holding device of the invention is preferably provided on itself with a tightening knob (rise in pressure) and an untightening knob (zero pressure) which allows the whole assembly to be completely independent without passing through the external electronic unit (stationary station).

During the machining, for reasons of deformation and of precision, the pressure may be reduced progressively without completely releasing the workpiece. This, in a first stage, allows efficiently clamping the workpiece in order to form a rough machining, and in a second stage, partially releasing the clamping for the purpose of fine machining in order to subject the workpiece the lowest possible stresses. This unexpectedly and unobviously allows increasing the machining accuracy.

The interface (stationary station) outside the self-contained unit may be connected to a programmable automatic unit, a central machine digital-control station or a computer in order to program several self-contained workpiece-holding devices or units simultaneously or separately at identical or different pressure values.

The invention offers the additional advantage of allowing the programming on a same self-contained workpiece-holding unit of one or several completely independent hydraulic outlet in pressure value as well as in order of opening and closing of each circuit. This allows separately clamping several workpieces on a same self-contained workpiece-holding device or, if desired, actuating double-acting power-cylinders.

The interface (stationary station) allows, by means of the infrared link, identifying in the self-contained workpiece-holding device every possible cause of failure, such as a lack of battery charge, a mechanical trouble (possible mechanical pump-cylinder jamming), lack of oil, absence of infrared linking, oil loss.

Lastly, the workpiece-holding device of the invention includes no piping, all the hydraulic circuits are integrated in the self-contained workpiece-holding device.

What is claimed is:

1. A device adapted to hold a workpiece of the type including compressed-fluid power-cylinders incorporated within orifices provided in the upper face of said device; fastening means adapted to be mounted on said upper face for fastening, by tightening or clamping, said workpiece through the medium of said compressed-fluid power-cylinders; a fluid pressure generator for feeding said compressed-fluid power-cylinders through a compressed fluid circuit; and a source of power for actuating said fluid pressure generator; wherein said pressure generator and said source of power are each incorporated in a recess of said device which is thus self-contained and said compressed-fluid circuit includes an integrated circuit constitued by passage-ways provided within the body of the device.

2. The device of claim 1, wherein said pressure generator is an electro-hydraulic set constituted by a motor-pump set.

3. The device of claim 1, wherein said source of power is constituted by rechargeable electric storage batteries.

4. The device of claim 1, selected from the group consisting of a plate, a square, a cube and a machine-tool table.

5. A device adapted to hold a workpiece of the type including compressed-fluid power-cylinders incorporated within recesses provided in the upper face of said device; fastening means adapted to be mounted on said upper face for fastening, by tightening or clamping, said workpiece through the medium of said compressed-fluid power-cylinders; a fluid pressure generator for feeding said compressed-fluid power-cylinders through a compressed fluid circuit; and a source of power for actuating said fluid pressure generator; wherein said pressure generator and said source of power are each incorporated in a recess of said device which is thus self-contained, said compressed fluid circuit includes an integrated circuit constituted by passage-ways provided within the body of the device, and at least one assembly is provided with valves for the delivery of said compressed fluid at a predetermined pressure, individually associated with one of said power-cylinders, so that each power-cylinder operates at a pressure independent of the operating pressure of the other power-cylinder or cylinders.

6. The device of claim 5, wherein each power-cylinder operates at a time different from that of the other power-cylinder or cylinders.

7. The device of claim 5, comprising at least two assemblies with afore-mentioned valves per power-cylinder so that each power-cylinder is operable at at least two different pressures.

8. The device of claim 5, wherein each assembly comprises three non-return valves, two of which being automatically actuated.

9. The device of claim 5, wherein said compressed fluid circuit includes a compressed-fluid feed duct connecting the outlet of the power generator fed with fluid from a reserve of fluid, to one or several power-cylinders and a compressed-fluid return duct connecting the outlet of said power-cylinder or cylinders to said reserve of fluid, each feed duct and return duct being subdivided into passageways for the supply and passage-ways for the return, respectively, of the fluid to and from each aforesaid assembly respectively.

10. The device of claim 5, wherein each power-cylinder is a single-acting cylinder.

11. The device of claim 8, wherein each said valve is actuated by an electromagnet, each electromagnet is operated automatically by being controlled from a central control station.

12. The device of claim 11, wherein the central control station is provided with linking device for linking by means of an infra-red device.

13. The device of claim 11, wherein the central station is equipped with an information processing unit, such as a microprocessor, adapted to be connected either to a manual operating device or to a digital control centre such as a programmable automatic device or a digital control machine.

14. The device of claim 13, wherein each aforesaid assembly comprises a pressure-sensitive device transmitting an information in relation to said pressure, which is transmitted and processed by the aforesaid information processing unit.

15. The device of claim 5, wherein each assembly is incorporated in the workpiece-holding device.

16. A device adapted to hold a workpiece of the type including compressed-fluid power-cylinders incorporated within orifices provided in the upper face of said device; fastening means adapted to be mounted on said upper face for fastening, by tightening or clamping, said workpiece through the medium of said compressed-fluid power-cylinders; a fluid pressure generator for feeding said compressed-fluid power-cylinders through a compressed fluid circuit; and a source of power for actuating said fluid pressure generator; wherein said pressure generator and said source of power are each incorporated in a recess of said device which is thus self-contained, said compressed fluid circuit includes an integrated circuit constituted by passage-ways provided within the body of the device, and at least one assembly is provided with valves for the delivery of said compressed fluid at a predetermined pressure, individually associated with one of the power-cylinders, so that each power-cylinder operates at a pressure independent of the operating pressure of the other power-cylinder or cylinders, each power-cylinder being a double-acting cylinder, each cavity of which is fed from a respective associated delivery assembly.

17. A control system for the control of one or several devices adapted to hold a workpiece, each of the type including compressed-fluid power-cylinders incorporated within orifices provided in the upper face of said device; fastening means adapted to be mounted on said upper face for fastening, by tightening or clamping, said workpiece through the medium of said compressed-fluid power-cylinders; a fluid pressure generator for feeding said compressed-fluid power-cylinders through a compressed fluid circuit; and a source of power for actuating said fluid pressure generator; said system comprising a separate central control station for the control of the workpiece-holding devices through the medium of an infrared-ray linking device, and wherein said pressure generator and said source of power are each incorporated in a recess of said device which is thus self-contained and said compressed fluid circuit includes an integrated circuit constituted by passage-ways provided within the body of the device.

18. The control system of claim 17, wherein the infrared-ray linking device constitutes a bi-directional control transmission path.

19. The control system of claim 17, comprising associated with each central station and with each workpiece-holding device an infrared-ray emitter-receiver set to allow bi-directional linkings between the central station and each device.

20. The control system of claim 17, wherein the central station is equipped with an information processing unit and is adapted to be connected to a manual operating device.

21. The control system of claim 14, wherein the central station is equipped with an information processing unit, and is adapted to be connected to a digital control centre.

22. The control system of claim 17, wherein the source of power, constituted by rechargeable storage batteries, of a workpiece-holding device is connectable to a recharging terminal associated with the central station.

23. A device adapted to hold a workpiece of the type including compressed-fluid power-cylinders incorporated within orifices provided in the upper face of said device; fastening means adapted to be mounted on said upper face for fastening, by tightening or clamping, said workpiece through the medium of said compressed-fluid power-cylinders; a fluid pressure generator for feeding said compressed-fluid power-cylinders through a compressed fluid circuit; and a source of power for actuating said fluid pressure generator; wherein said pressure generator and said source of power are each incorporated in a recess of said device which is thus self-contained, said compressed fluid circuit includes an integrated circuit constituted by passage-ways provided within the body of the device, at least one assembly is provided with valves for the delivery of said compressed fluid at a predetermined pressure, individually associated with one of said power-cylinders, so that each power-cylinder operates at a pressure independent of the operating pressure of the other power-cylinder or cylinders, and each assembly is incorporated in the workpieceholding device.

* * * * *